United States Patent
Liu et al.

(10) Patent No.: US 11,468,254 B2
(45) Date of Patent: Oct. 11, 2022

(54) QUICK POSITIONING METHOD FOR FORMING TWO-DIMENSIONAL CODE POSITIONING POINT DOT MATRIX, AND QUICK POSITIONING METHOD FOR CAPTURING TWO-DIMENSIONAL CODE POSITIONING POINT DOT MATRIX

(71) Applicant: UNI2K Information Technology Co., Ltd., Tongxiang (CN)

(72) Inventors: Shaolei Liu, Tongxiang (CN); Yi Shen, Tongxiang (CN); Nianqing Luo, Tongxiang (CN); Zhehai Zhu, Tongxiang (CN)

(73) Assignee: UNI2K INFORMATION TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 17/297,582

(22) PCT Filed: Jan. 5, 2020

(86) PCT No.: PCT/CN2020/070365
§ 371 (c)(1),
(2) Date: May 27, 2021

(87) PCT Pub. No.: WO2020/143559
PCT Pub. Date: Jul. 16, 2020

(65) Prior Publication Data
US 2022/0036024 A1 Feb. 3, 2022

(30) Foreign Application Priority Data

Jan. 7, 2019 (CN) .......................... 201910010787.2
Jan. 7, 2019 (CN) .......................... 201910011411.3

(51) Int. Cl.
*G06K 7/14* (2006.01)

(52) U.S. Cl.
CPC .................................. *G06K 7/1417* (2013.01)

(58) Field of Classification Search
CPC ....................... G06K 7/1417; G06K 19/06037
See application file for complete search history.

(56) References Cited

U.S. PATENT DOCUMENTS 6,267,296 B1      7/2001   Ooshima et al.
2018/0341844 A1*  11/2018  Li .................... G06K 19/06037

FOREIGN PATENT DOCUMENTS

CN      101093553 A     12/2007
CN      102034127 A     4/2011
(Continued)

*Primary Examiner* — Matthew Mikels
(74) *Attorney, Agent, or Firm* — IPro, PLLC

(57) ABSTRACT

The invention relates to the field of data identification, in particular to a technique for forming and capturing a two-dimensional code. The invention provides a method for forming and capturing a two-dimensional code positioning dot matrix for rapid positioning. The method for forming the two-dimensional code positioning point lattice comprises the following steps: Setting or reading the positioning point data lattice; drawing four central symmetric primary positioning point lattice on the setting background; and adding the positioning interval area to the periphery of the primary positioning point lattice. The invention solves the technical problems of long locating time and high locating error rate in 2d code recognition, strengthens the reliability of two-dimensional code locating, improves the identifying efficiency, and reduces the pollution of locating points and data.

5 Claims, 6 Drawing Sheets

(56) References Cited

FOREIGN PATENT DOCUMENTS

| | | |
|---|---|---|
| CN | 102243704 A | 11/2011 |
| CN | 108334922 A | 7/2018 |

* cited by examiner

QUICK POSITIONING METHOD FOR FORMING TWO-DIMENSIONAL CODE POSITIONING POINT DOT MATRIX, AND QUICK POSITIONING METHOD FOR CAPTURING TWO-DIMENSIONAL CODE POSITIONING POINT DOT MATRIX

TECHNICAL FIELD

The disclosure herein relates to the field of data recognition, and in particular to a technology for forming and capturing a two-dimensional code.

BACKGROUND

A two-dimensional code is usually in the form of a matrix array, encoding and decoding start from a designated starting point of the matrix array, and accurate and quick reading of the designated starting point is the key to guarantee the success of decoding.

Prior art 1 is a Chinese patent application with the patent publication No. CN102034127A, the technical solution thereof is shown in FIG. 1. The invention discloses a system for a high-capacity two-dimensional barcode and an encoding method therefor. In the invention, the positioning points are not sufficiently obvious in shape feature, and are easy to confuse with other contents, so that it takes a long time in the process of recognition and positioning of the positioning points; there is no secondary positioning point, the calculation error probability is high, so that the correctness of information cannot be guaranteed, and the speed of reading cannot be increased; the positioning points are three in number and are different in shape, and have no consistency and symmetry in design, thereby having extremely poor visual effect. In the invention, the positioning process is to find three positioning points through four dashed outline borders, the image range involved is large, which increases the difficulty in the positioning process; and there is no image border, which leads to edge data pollution and is not beneficial to pattern recognition.

Prior art 2 is a Chinese patent application with the patent publication No. CN102243704A, the technical solution thereof is shown in FIG. 2. The invention discloses a positioning system for a two-dimensional code and a recognition method for a two-dimensional code. In the invention, positioning points are set at the four endpoints of the two-dimensional code. However, the positioning points are not sufficiently obvious in shape feature, and are easy to confuse with other contents, so that it takes a long time in the process of recognition and positioning of the positioning points; no spacer region is set, which affects the efficiency of positioning and data reading; patterns obtained through optical characteristics are different, are harsh to external optical conditions and are not practical; information partitioning management is not involved, which is not beneficial to the security of data, and affects the reading of data; and there is no image border, which leads to edge data pollution and is not beneficial to pattern recognition.

SUMMARY

In order to solve the technical problems of long time consumed in two-dimensional code positioning and high positioning error rate existing in the prior art, the present invention proposes a method for forming and capturing a positioning point dot matrix of a two-dimensional code quickly positioned which has the advantages of beautiful appearance, enhancement of positioning reliability, improvement of recognition efficiency, and reduction of positioning points and data pollution.

To achieve the above purpose, the present application provides 1 a method for forming a positioning point dot matrix of a two-dimensional code quickly positioned, comprising the following steps:

step 1: setting or reading positioning point data dot matrixes;

step 2: drawing four centrosymmetric primary positioning point dot matrixes on a setting background; and step 3: adding positioning spacer regions to the periphery of the primary positioning point dot matrixes.

Preferably, step 1 comprises: reading the positioning point data dot matrixes from a database, alternatively, the positioning point data dot matrixes are positioning point dot matrixes of a fixed type.

Preferably step 2 comprises:

Step 2.1: drawing a first primary positioning point dot matrix on a setting coding region background.

Step 2.2: by taking the first primary positioning point dot matrix as a reference, moving a distance of a unit length of $L_1$, and drawing a second primary positioning point dot matrix.

Step 2.3: by taking the first and second primary positioning point dot matrixes as a reference, moving a distance of a unit length of $L_2$, and drawing third and fourth primary positioning point dot matrixes.

Step 2.4: drawing secondary positioning point dot matrixes in the X-axis direction.

Step 2.5: drawing secondary positioning point dot matrixes in the Y-axis direction.

Preferably, step 2.4 comprises:

Step 2.4.1: by taking the first and second primary positioning point dot matrixes as a reference, moving a distance of a unit length of $L_2/n$ to the third and fourth primary positioning point dot matrixes respectively, drawing $X_1^{th}$ and $X_2^{th}$ secondary positioning point dot matrixes, where n is an integer not less than 1, when n=1, there is no secondary positioning point dot matrix in the X-axis direction, skipping to step 6.

Step 2.4.2: by taking the $X_1^{th}$ and $X_2^{th}$ secondary positioning point dot matrixes as a reference, moving a distance of a unit length of $L_2/n$ to the third and fourth primary positioning point dot matrixes respectively, and drawing $X_3^{th}$ and $X_4^{th}$ secondary positioning point dot matrixes.

Step 2.4.3: repeating step 5.2 (n−2) times, and drawing to $X_{(2n-3)}^{th}$ and $X_{(2n-2)}^{th}$ secondary positioning point dot matrixes.

Preferably, step 2.5 comprises:

Step 2.5.1: by taking the first and third primary positioning point dot matrixes as a reference, moving a distance of a unit length of $L_1/m$ to the second and fourth primary positioning point dot matrixes respectively, drawing $Y_1^{th}$ and $Y_3^{th}$ secondary positioning point dot matrixes, where m is an integer not less than 1, when m=1, there is no secondary positioning point dot matrix in the Y-axis direction, skipping to step 7.

Step 2.5.2: by taking the $Y_1^{th}$ and $Y_2^{th}$ secondary positioning point dot matrixes as a reference, moving a distance of a unit length of $L_1/m$ to the second and fourth primary positioning point dot matrixes respectively, and drawing $Y_3^{th}$ and $Y_4^{th}$ secondary positioning point dot matrixes.

Step 2.5.3: repeating step 6.2 (m−2) times, and drawing to $Y_{(2m-3)}^{th}$ and $Y_{(2m-2)}^{th}$ secondary positioning point dot matrixes.

Preferably, step 3 comprises: adding positioning spacer regions to the periphery of the secondary positioning point dot matrixes.

Preferably, the two-dimensional code is used for authentication of information in an off-line state or off-network state.

A method for catching a positioning point dot matrix of a two-dimensional code quickly positioned, comprising the following steps:

Step 1: acquiring a two-dimensional code picture, and processing the picture to obtain dot matrix data.

Step 2: capturing a sub dot matrix A of a*b (a>=3, b>=3) at the end according to a dot matrix sequence;

Step 3: judging whether positioning point spacer regions are around the sub dot matrix A, and judging whether the sub dot matrix A is consistent with the standard positioning point data in the database, if not, returning to step 2.

Step 4: by taking the sub dot matrix A as the reference, moving a distance of a unit length of L1, and capturing a sub dot matrix B of a*b (a>=3, b>=3); by taking the sub dot matrixes A and B as a reference, moving a distance of a unit length of L2, and capturing two sub dot matrixes C and D of a*b respectively.

Step 5: judging whether the sub dot matrixes B, C and D are consistent with the standard positioning point data, if not, returning to step 2.

Preferably, the method further comprises:

Step 6: capturing secondary positioning point dot matrixes in the X-axis direction.

Step 7: capturing secondary positioning point dot matrixes in the Y-axis direction.

Step 8: judging whether secondary positioning point dot matrix data is consistent with the standard positioning point data.

Step 9: feeding back information about four primary positioning point dot matrixes and 2(n+m−2) secondary positioning point dot matrixes for next data reading.

Preferably, the matrix of a*b is a matrix of 9*9.

Preferably, step 6 comprises:

step 6.1: by taking the first and second primary positioning point dot matrixes as a reference, moving a distance of a unit length of $L_2/n$ to the third and fourth primary positioning point dot matrixes to capture a sub dot matrix of a*a, obtaining $X_1^{th}$ and $X_2^{th}$ secondary positioning point dot matrixes, where n is an integer not less than 1, when n=1, not capturing the secondary positioning point dot matrixes in the X-axis direction, skipping to step 8;

step 6.2: by taking the first and second primary positioning point dot matrixes as a reference, moving a distance of a unit length of $2*L_2/n$ to the third and fourth primary positioning point dot matrixes to capture a sub dot matrix of a*a, obtaining $X_3^{th}$ and $X_4^{th}$ secondary positioning point dot matrixes; and step 6.(n−1): repeating step 6.2 (n−2) times in total, and capturing to $X_{(2n-3)}^{th}$ and $X_{(2n-2)}^{th}$ secondary positioning point dot matrixes.

Preferably, step 7 comprises:

step 7.1: by taking the first and third primary positioning point dot matrixes as a reference, moving a distance of a unit length of $L_1/m$ to the second and fourth primary positioning point dot matrixes to capture a sub dot matrix of a*a, obtaining $Y_1^{th}$ and $Y_2^{th}$ secondary positioning point dot matrixes, where m is an integer not less than 1, when m=1, not capturing the secondary positioning point dot matrixes in the Y-axis direction, skipping to step 9;

step 7.2: by taking the first and third primary positioning point dot matrixes as a reference, moving a distance of a unit length of $2*L_1/m$ to the second and fourth primary positioning point dot matrixes to capture a dot matrix of a*a, obtaining $Y_3^{th}$ and $Y_4^{th}$ secondary positioning point dot matrixes; and step 7.(m−1): repeating step 7.2 (m−2) times in total, and capturing to $Y(2m-3)^{th}$ and $Y_{(2m-2)}^{th}$ secondary positioning point dot matrixes.

Preferably, the two-dimensional code is used for authentication of information in an off-line state or off-network state.

Preferably, the two-dimensional code is used for recognition of credentials including licenses, business cards and nameplates.

Preferably, the two-dimensional code is used for recognition of financial documents including insurance policies, counterfoils, traffic tickets and financial statements.

Preferably, the two-dimensional code is used for recognition of announcements including legal documents, certificates, specifications, product packaging, advertisements and printed matter.

A kind of two-dimensional code quickly positioned, comprises:

coding region,

The coding region comprises four centrosymmetric major fixing sites at four vertices of the coding region, and the main positioning point and the interval area outside the coding area; The coding area also includes a plurality of auxiliary positioning points located on the side line of the coding area.

Preferably, the snowflake graph dot matrix comprises $2^{2n}$ rectangular color blocks that form a ring and a circle color area or a solid rectangular color area or a solid square color area inside the rectangular color block, n is an integer greater than 1.

Preferably, a positioning interval region is arranged around the positioning point, and the two-dimensional code also includes a border contour region for reducing data contamination, and a main interval region between the border contour region and the coding region.

Preferably, the two-dimensional code coding area includes a plurality of data areas and a camouflage isolation area spaced differently, and the plurality of data areas and the camouflage isolation area are masked for processing.

Preferably, the two-dimensional code is used for authentication of information in an off-line state or off-network state.

BRIEF DESCRIPTION OF FIGURES

FIG. 3 is a diagram showing a unit positioning point dot matrix provided in embodiment 1 of the present invention;

DETAILED DESCRIPTION

Figure 1:
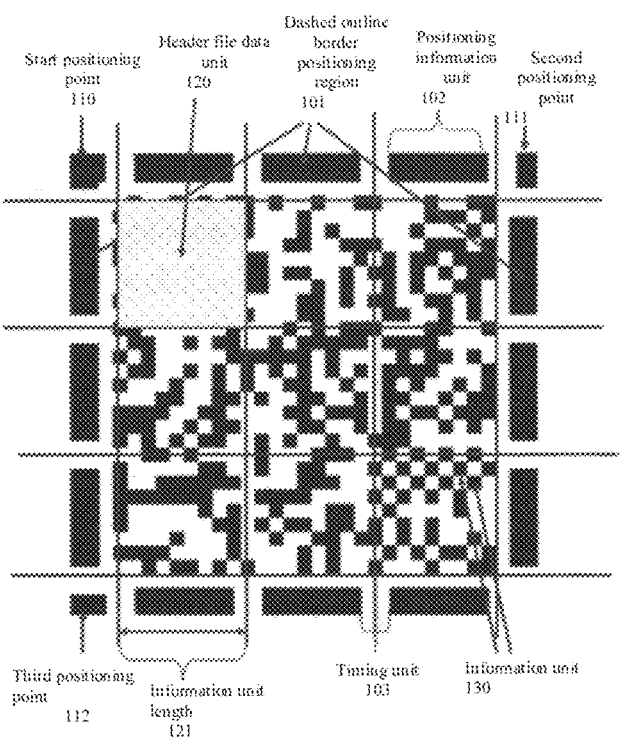
FIG. 1 is an example diagram of a two-dimensional code in prior art 1.
Figure 2:
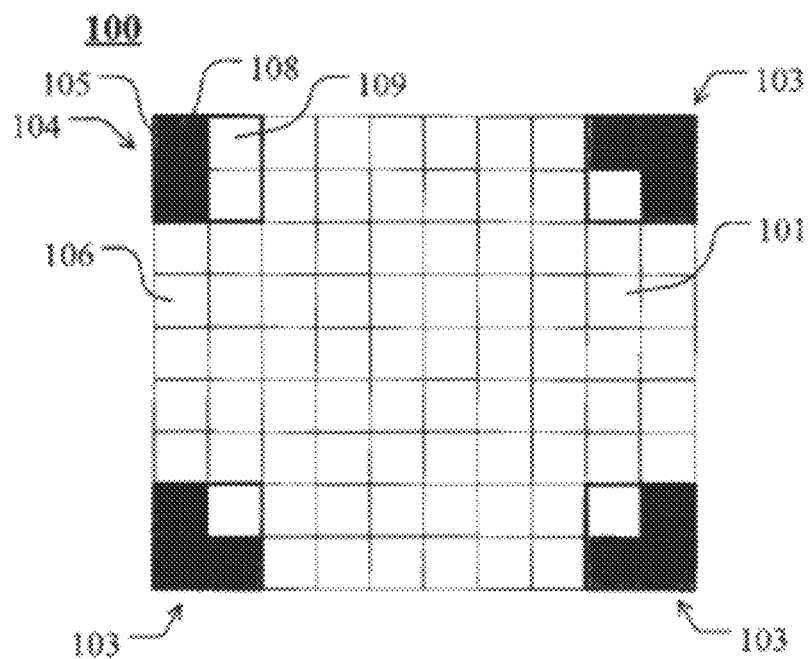
FIG. 2 is an example diagram of a two-dimensional code in prior art 2.

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

In view of the fact that the existing methods cannot realize efficient and high-precision positioning and recognition of two-dimensional codes, embodiments of the present invention provide a method for forming and capturing a positioning point dot matrix of a two-dimensional code. The present invention will be described in detail below in combination with the drawings.

Embodiment 1

Figure 3:
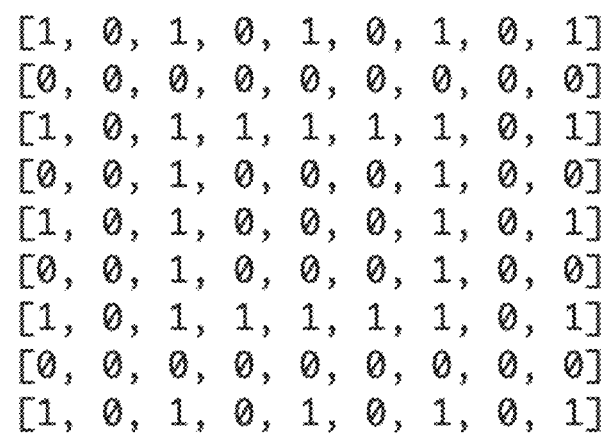

This embodiment provides a method for forming a single positioning point, as shown in FIG. 3.

An image model of the present invention exists in the form of 0-1 digital dot matrix in software, so the process of generating a single positioning point is the process of constructing a 0-1 digital dot matrix. The size of the digital dot matrix is specified as 9×9, so the positioning point is a unit matrix of 9×9. The digit in the matrix is 0 or 1, or a combination of other any two different digits. The unit dot matrix is stored in a software generating database for generating the positioning point.

An image model of the present invention exists in the form of 0-1 digital dot matrix in software, so the process of generating a single positioning point is the process of constructing a 0-1 digital dot matrix. The size of the digital dot matrix is specified as 9×9, so the positioning point is a unit matrix of 9×9. The digit in the matrix is 0 or 1, or a combination of other any two different digits. The unit dot matrix is stored in a software generating database for generating the positioning point.

The Unit Orientation Dot Matrix is shown in FIG. 3. Because the DOT Matrix has a symmetrical center, the contrast speed of the Dot Matrix is four times as fast as that of the asymmetric graph, the invention can realize the comparison of four symmetrical parts at the same time. If the unit lattice is asymmetric, the process of comparing the lattice one by one is relatively time-consuming. The positioning point of the invention comprises light-colored dark lines in four directions and light-colored dark alternating lines in eight directions. The above lines form the middle of the whole blank part, blank part of the outer dark solid frame and light solid frame, as well as the most peripheral depth of the law of alternating the outer border, constitute a snowflake-like figure. This obvious feature can guarantee the success rate of locating point recognition, and directly affect the accuracy of the following data analysis of the two-dimensional Code. Therefore, the invention provides a reliable positioning point graph which can improve the identification efficiency of data analysis.

Embodiment 2

Figure 4:
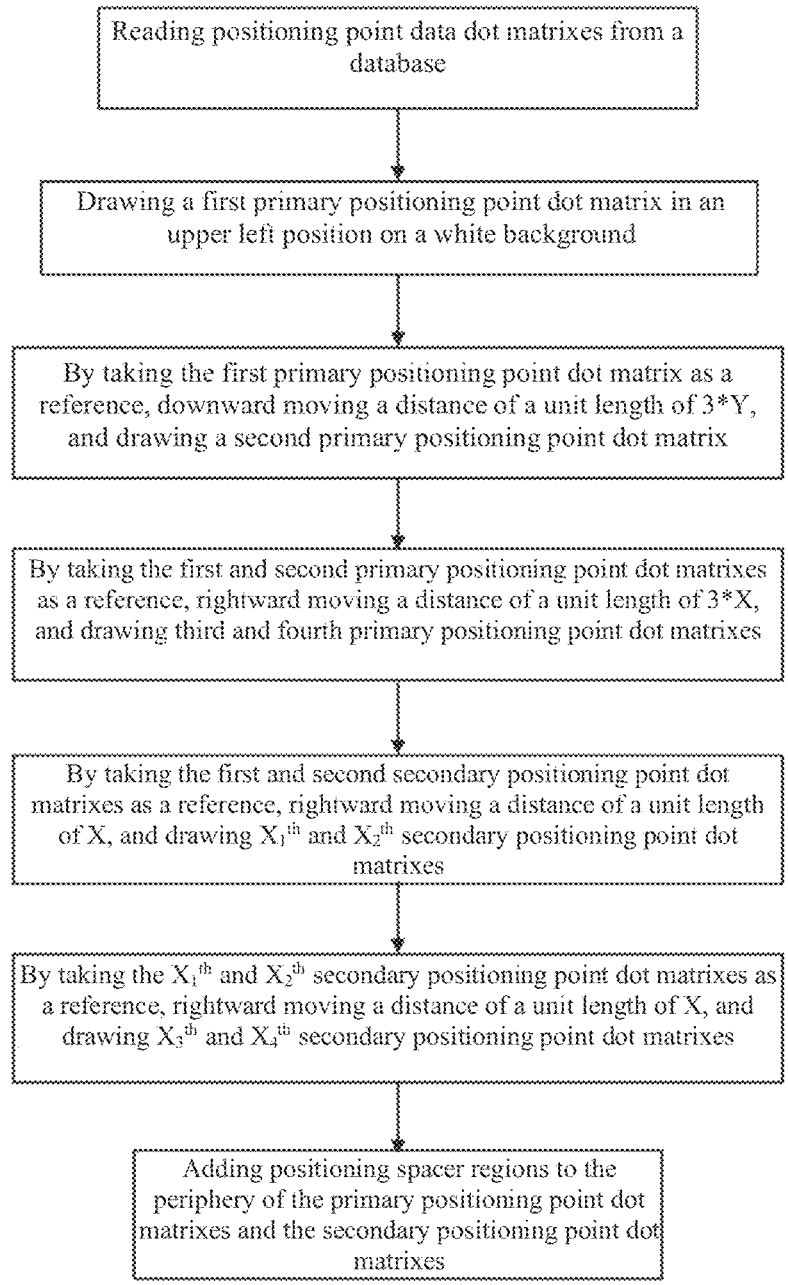
FIG. 4 is a diagram showing a method for forming a positioning point dot matrix of a two-dimensional code provided in embodiment 2 of the present invention.

This embodiment provides a method for forming a positioning point dot matrix of a two-dimensional code, comprising the following steps as shown in FIG. 4:

step 1: reading positioning point data dot matrixes from a database;

step 2: drawing a first positioning point dot matrix in an upper left position on a setting coding region background;

step 3: by taking the first primary positioning point dot matrix as a reference, downward moving a distance of a unit length of 3*Y, and drawing a second primary positioning point dot matrix;

step 4: by taking the first and second primary positioning point dot matrixes as a reference, rightward moving a distance of a unit length of 3*X, and drawing third and fourth primary positioning point dot matrixes;

step 5.1: by taking the first and second primary positioning point dot matrixes as a reference, rightward moving a distance of a unit length of X respectively, and drawing $X_1^{th}$ and $X_2^{th}$ secondary positioning point dot matrixes;

step 5.2: by taking the $X_1^{th}$ and $X_2^{th}$ secondary positioning point dot matrixes as a reference, rightward moving a distance of a unit length of X respectively, and drawing $X_3^{th}$ and $X_4^{th}$ secondary positioning point dot matrixes;

step 6: adding positioning spacer regions to the periphery of the primary positioning point dot matrixes and the secondary positioning point dot matrixes.

The formation process of positioning points is as follows: the positions of other positioning points are calculated mainly according to the position and correlation of a single primary positioning point, and the positions of all positioning points are finally locked. Auxiliary positioning is used to improve the parsing speed of the core data content of the two-dimensional code. Through auxiliary positioning, the errors caused by the conversion of a pattern into a dot matrix can be corrected, thus improving the success rate of data parsing and then achieving the effect of increasing the parsing speed.

In step 6 of the process, a light-colored spacer region is added near each positioning point to reduce the probability that the positioning points cannot be recognized due to errors in the picture processing process. The spacer region helps prevent pollution of critical data. After all the positioning points are generated, an axisymmetric pattern composed of eight centrosymmetric positioning points can be obtained, and the correlation calculation can be guaranteed. The pattern has the advantages of appropriate proportion, nattiness and beautiful appearance.

Embodiment 3

Figure 5:
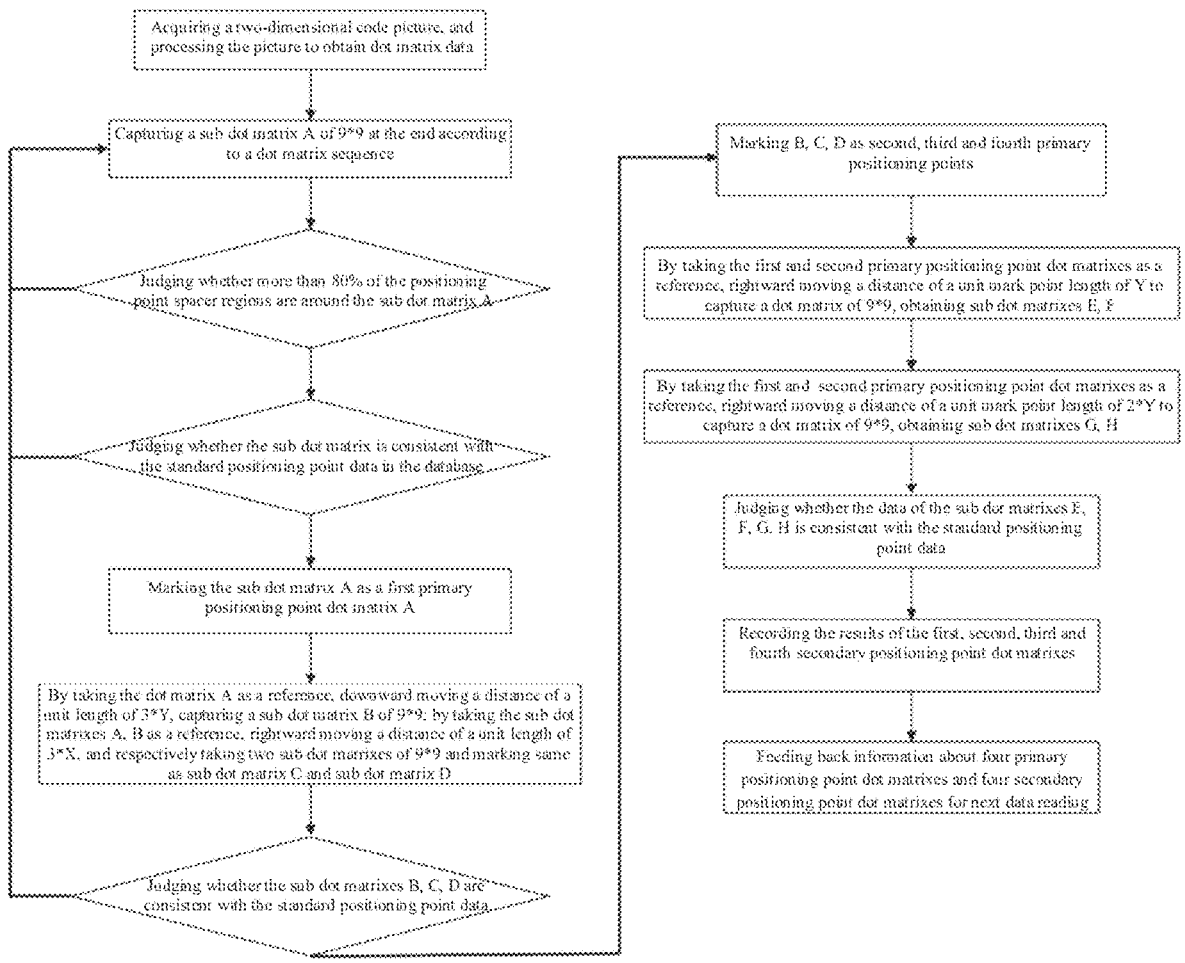
FIG. 5 is a diagram showing a method for catching a positioning point dot matrix of a two-dimensional code provided in embodiment 3 of the present invention.

This embodiment provides a method for capturing a positioning point dot matrix of a two-dimensional code, comprising the following steps as shown in FIG. 5:

step 1: acquiring a two-dimensional code picture, and processing the picture to obtain dot matrix data;

step 2: capturing a sub dot matrix A of 9*9 at the end according to a dot matrix sequence;

step 3: judging whether more than 80% of the positioning point spacer regions are around the sub dot matrix A, if not, returning to step 2;

step 4: judging whether the sub dot matrix A is consistent with the standard positioning point data in the database, if not, returning to step 2;

step 5: marking the sub dot matrix A as a first primary positioning point dot matrix A;

step 6: by taking the dot matrix A as a reference, downward moving a distance of a unit length of 3*Y, and capturing a sub dot matrix B of 9*9; by taking the sub dot matrixes A and B as a reference, rightward moving a distance of a unit length of 3*X, and respectively taking two sub dot matrixes of 9*9 and marking same as sub dot matrix C and sub dot matrix D;

step 7: judging whether the sub dot matrixes B, C and D are consistent with the standard positioning point data, if not, returning to step 2, and if so, marking B, C, D as second, third and fourth primary positioning point dot matrixes;

step 8.1: by taking the first and second primary positioning point dot matrixes as a reference, rightward moving a distance of a unit mark point length of Y to capture a sub dot matrix of 9*9, obtaining sub dot matrixes E, F;

step 8.2: by taking the first and second primary positioning point dot matrixes as a reference, rightward moving a distance of a unit mark point length of 2*Y to capture a dot matrix of 9*9, obtaining sub dot matrixes G, H;

step 9: judging whether the data of the sub dot matrixes E, F, G, H is consistent with the standard positioning point data;

step 10: recording the results of the first, second, third and fourth secondary positioning point dot matrixes (E, F, G, H);

step 11: feeding back information about four primary positioning point dot matrixes and four secondary positioning point dot matrixes for next data reading.

In the parsing process, the positioning point matrix of the present invention has the characteristics of axial symmetry and central symmetry, so that positioning points are captured quickly during capturing and the parsing speed is increased. As long as one of the four primary positioning points is positioned, the remaining positioning points can be found.

In the present invention, secondary positioning points may not be required. In the capturing process of the secondary positioning points, only the results of corresponding secondary positioning points need to be returned, and there is no need to re-capture the primary positioning points to confirm the secondary positioning points, saving time and unnecessary processes. If there is no secondary positioning point, in the present invention, the positions of the secondary positioning points are predicted through the primary positioning points, and data is further parsed. Of course, this process may cause an increase in the time required for parsing.

Embodiment 4

Figure 6:
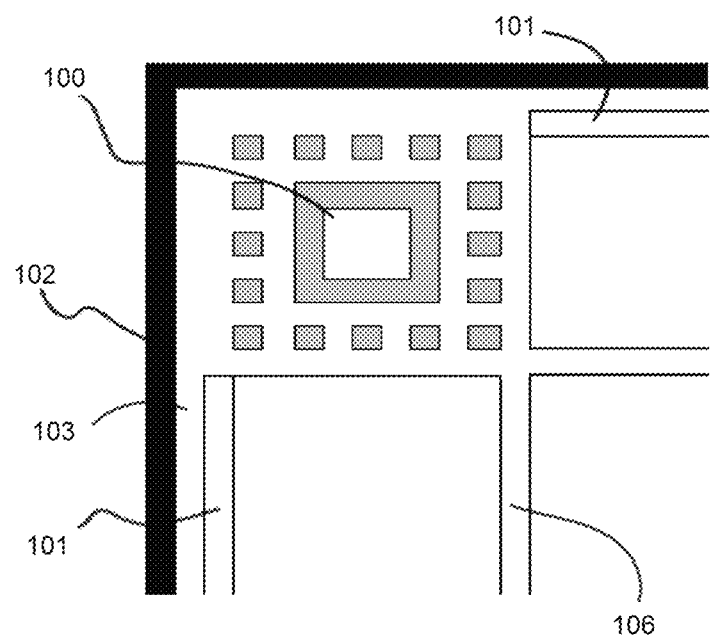
FIG. 6 is an example diagram of a two-dimensional code provided in embodiment 4.
Figure 7:
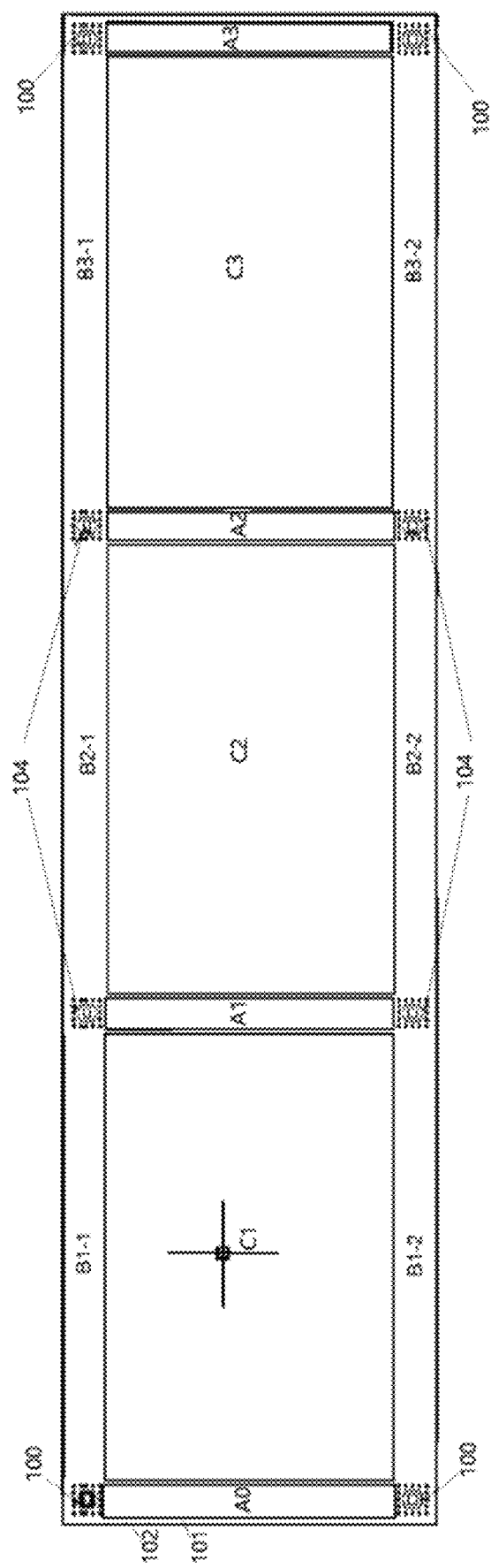
FIG. 7 is an example diagram of a two-dimensional code provided in embodiment 4.

The embodiment provides a two-dimensional code, as shown in FIGS. 6 and 7, comprising a border contour area 102 for reducing data contamination, a coding area, and a main gap area 103 between the border contour area 102 and the coding area; The coding region comprises four main positioning points 100 located at four vertices of the coding region, a plurality of data regions 101 and a camouflage isolation region 106 with different data regions. The data area 101 is composed of A0, A1, A2, A3, B1-1, B2-1, B3-1, B1-2, B 2-2, B3-2, CA, C2, C3. The two-dimensional code also includes four auxiliary locating points 104 on the side line of the coding area. Both primary and secondary positioning points were snowflake-shaped centre-symmetry. The main positioning point of the embodiment achieves enhanced recognition effect through its obvious features on one hand, and aesthetic effect through symmetry on the other hand. Furthermore, the auxiliary positioning point of the embodiment is the same as the main positioning point, which improves the recognition efficiency while reducing the graphic error. Light colored spacers significantly reduce the likelihood of location and data contamination.

To sum up, the method for forming and capturing a positioning point dot matrix of a two-dimensional code provided in embodiments of the present invention has the following advantageous effects:

(1) In the positioning mode of an encryption pattern of the present invention, an alabastrine centrosymmetric positioning pattern is adopted, the reliability of positioning is enhanced, and the parsing recognition rate is improved;

(2) The primary and secondary positioning points in the encryption pattern of the present invention are designed into axisymmetric images, which reduces the error of image processing and increases the data parsing speed;

(3) The light-colored spacer region in the encryption pattern of the present invention can avoid data pollution, protect the integrity of data of the positioning points, and improve the success rate of data parsing.

The present invention can be used for positioning of all two-dimensional codes, and can also be used for positioning of images and pictures.

The objects, technical solutions and advantageous effects of the present invention are further described in detail through the specific embodiments. It is to be understood that the above only describes specific embodiments of the present invention and is not intended to limit the protection scope of the present invention. Any modification, equivalent replacement, improvement, etc. made within the spirit and the principle of the present invention shall be contained within the protection scope of the present invention.

What is claimed is:

1. A method comprising:
   step 1: obtaining positioning point data;
   step 2: drawing four centrosymmetric primary positioning point dot matrixes, based on the positioning point data;
   step 3: adding positioning spacer regions at a periphery of the primary positioning point dot matrixes;
   wherein step 2 comprises:
      step 2.1: drawing a first primary positioning point dot matrix of the four centrosymmetric primary positioning point dot matrixes;
      step 2.2: drawing a second primary positioning point dot matrix of the four centrosymmetric primary positioning point dot matrixes, at a distance of L1 from the first primary positioning point dot matrix;
      step 2.3: drawing a third and a fourth primary positioning point dot matrixes of the four centrosymmetric primary positioning point dot matrixes, at a distance of L2 respectively from the first and the second primary positioning point dot matrixes;
      step 2.4: drawing a first set of secondary positioning point dot matrixes;
      step 2.5: drawing a second set of secondary positioning point dot matrixes.

2. The method of claim 1, wherein step 1 comprises obtaining the positioning point data from a database.

3. The method of claim 1, wherein step 2.4 comprises:
   step 2.4.1: drawing $X1^{th}$ secondary positioning point dot matrix of the first set at a distance of L2/n from the first primary positioning point dot matrix and toward the third primary positioning point dot matrix, and drawing $X2^{th}$ secondary positioning point dot matrix of the first set at a distance of L2/n from the second primary positioning point dot matrix and toward the fourth primary positioning point dot matrix, where n is an integer greater than 1;
   step 2.4.2: drawing $X3^{th}$ secondary positioning point dot matrix of the first set at a distance of L2/n from the $X1^{th}$ secondary positioning point dot matrix and toward the third primary positioning point dot matrix, and drawing $X4^{th}$ secondary positioning point dot matrix of the first set at a distance of L2/n from the $X2^{th}$ secondary positioning point dot matrix and toward the fourth primary positioning point dot matrix.

4. The method of claim 1, wherein step 2.5 comprises:
   step 2.5.1: drawing $Y1^{th}$ secondary positioning point dot matrix of the second set at a distance of L1/m from the first primary positioning point dot matrix and toward the second primary positioning point dot matrix, and drawing $Y3^{th}$ secondary positioning point dot matrix of the second set at a distance of L1/m from the third primary positioning point dot matrix and toward the fourth primary positioning point dot matrix, where m is an integer greater than 1;

step 2.5.2: drawing $Y3^{th}$ secondary positioning point dot matrix of the second set at a distance of L1/m from the $Y1^{th}$ secondary positioning point dot matrix and toward the second primary positioning point dot matrix, and drawing $Y4^{th}$ secondary positioning point dot matrix of the second set at a distance of L1/m from the $Y2^{th}$ secondary positioning point dot matrix and toward the fourth primary positioning point dot matrix.

5. The method of claim 1, wherein the positioning spacer regions are at a periphery of the first set and the second set.

* * * * *